United States Patent
Handa et al.

(10) Patent No.: US 8,055,223 B2
(45) Date of Patent: Nov. 8, 2011

(54) RADIO RECEIVER

(75) Inventors: Shinichi Handa, Nara-ken (JP); Eiji Suematsu, Nara-ken (JP); Atsushi Yamada, Nara-ken (JP); Keisuke Sato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/872,553

(22) Filed: Aug. 31, 2010

(65) Prior Publication Data

US 2010/0330945 A1 Dec. 30, 2010

Related U.S. Application Data

(62) Division of application No. 11/580,014, filed on Oct. 13, 2006, now abandoned.

(30) Foreign Application Priority Data

Oct. 13, 2005 (JP) .................. 2005-298866

(51) Int. Cl.
*H04B 1/18* (2006.01)
(52) U.S. Cl. .......... 455/188.1; 455/326; 455/333; 327/530; 327/306; 327/315; 327/324; 327/327; 348/731
(58) Field of Classification Search ............ 348/731; 455/188.1, 326, 333; 327/530, 306, 315, 327/324, 327
See application file for complete search history.

(56) References Cited

U.S. PATENT DOCUMENTS

| 4,160,213 | A | 7/1979 | Carter |
| 4,947,062 | A | 8/1990 | Weiner et al. |
| 5,548,222 | A | 8/1996 | Jensen et al. |
| 6,072,352 | A | 6/2000 | McNamara et al. |
| 6,693,578 | B1 | 2/2004 | Martinson |
| 2005/0128363 | A1* | 6/2005 | Su et al. .................. 348/731 |
| 2006/0246861 | A1 | 11/2006 | Dosanjh et al. |

FOREIGN PATENT DOCUMENTS

| JP | 2001-127658 A | 5/2001 |
| JP | 2001-211092 A | 8/2001 |
| JP | 2003-258655 A | 9/2003 |
| JP | 2004-343242 A | 12/2004 |
| JP | 2005-039762 A | 12/2005 |

* cited by examiner

*Primary Examiner* — Junpeng Chen
(74) *Attorney, Agent, or Firm* — Birch, Stewart, Kolasch & Birch, LLP

(57) ABSTRACT

A radio receiver includes a down-converter 110 for receiving a radio multiplexed signal containing a first signal and a second signal, multiplying the first signal and the second signal by a mixer 104 to thereby down-convert the radio multiplexed signal and generate an intermediate frequency signal 5e. The mixer 104 has a control section for controlling an operating bias of the mixer 104 in response to a signal strength of at least either one of the first signal or the second signal. Thus, the dynamic range of the mixer can be widened so that stable image characteristics can be obtained over a wide range of transmission distance.

3 Claims, 13 Drawing Sheets

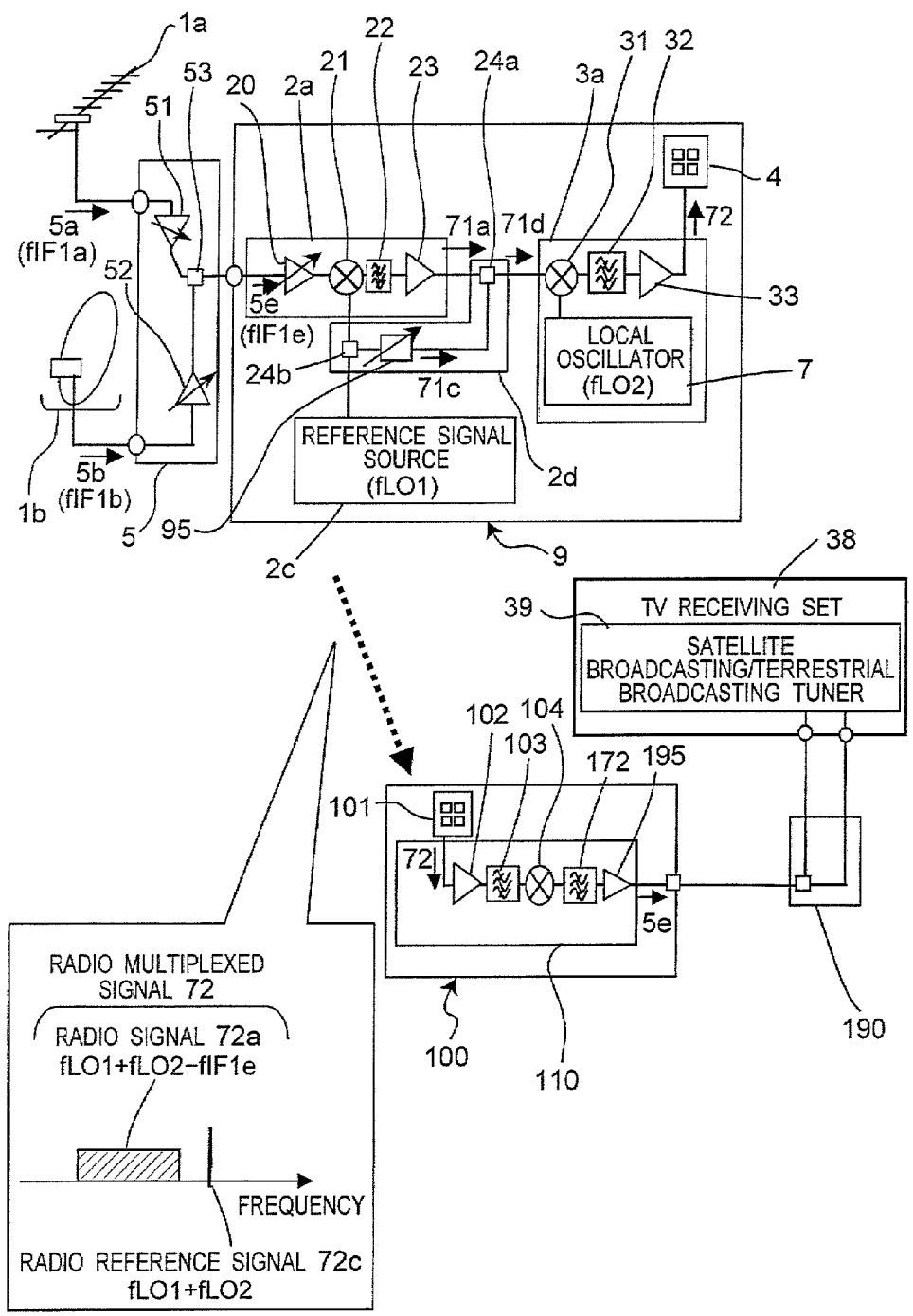

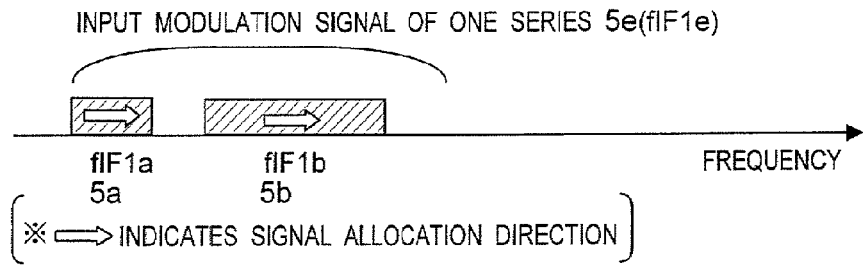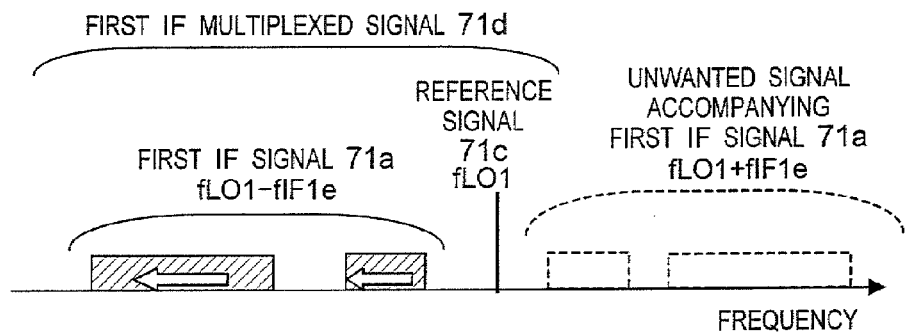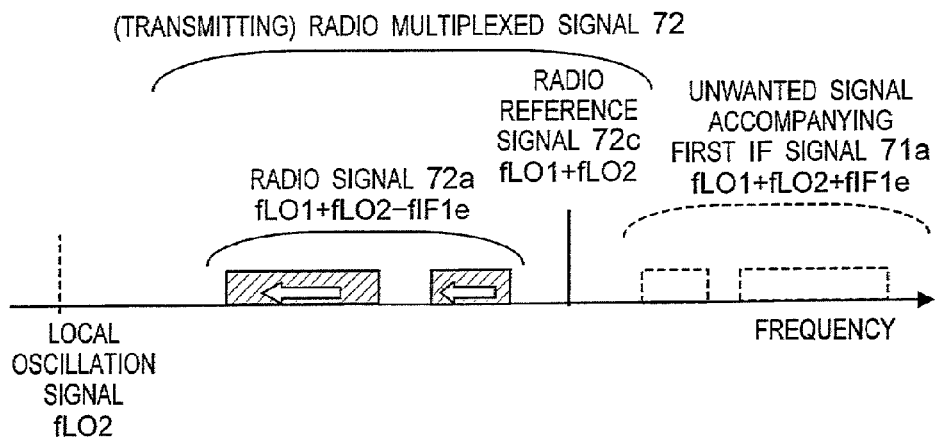

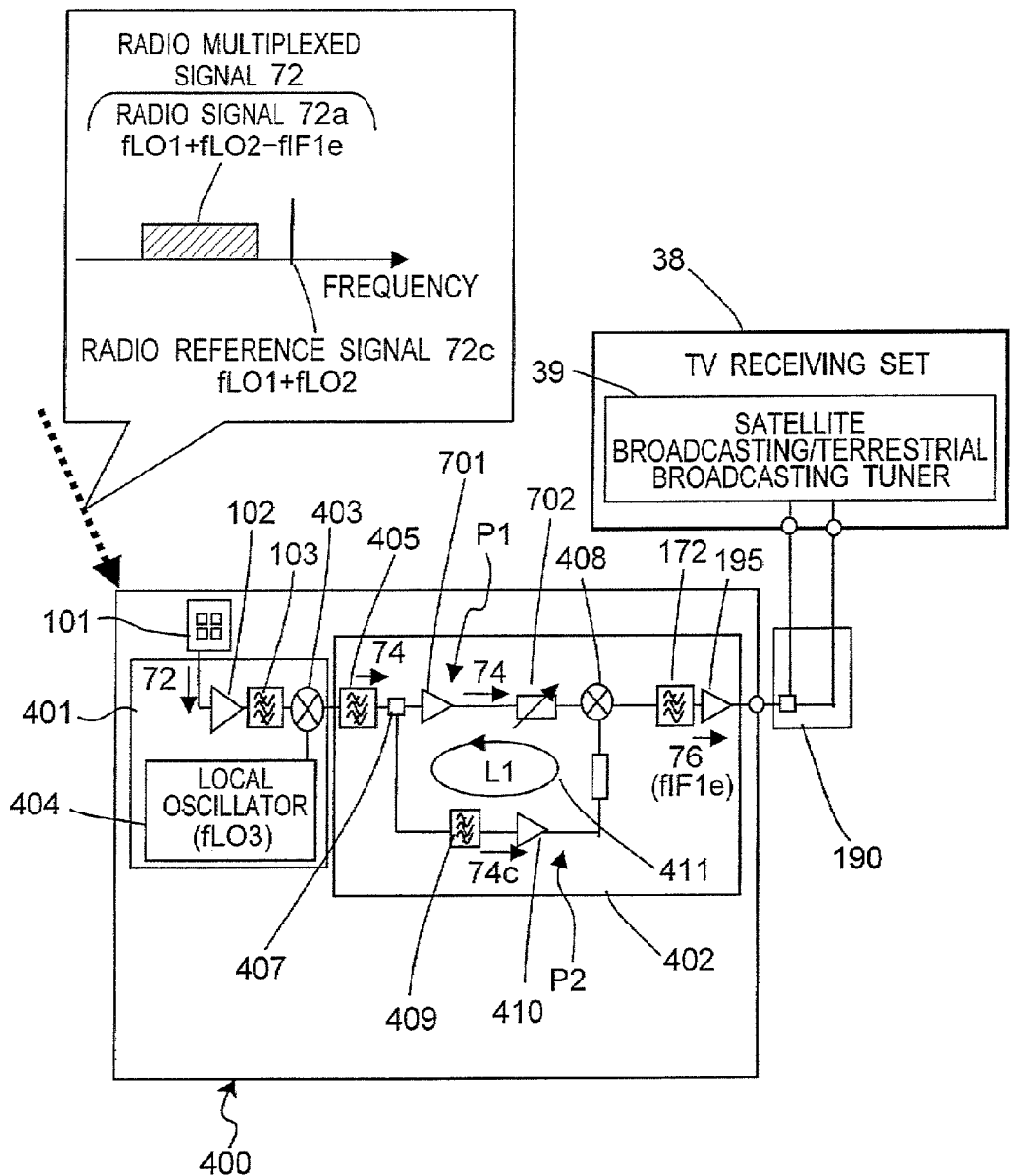

RADIO RECEIVER

CROSS-REFERENCE TO RELATED APPLICATION

This application is a Divisional of application Ser. No. 11/580,014 filed on Oct. 13, 2006 now abandoned, and for which priority is claimed under 35 U.S.C. §120. This application also claims priority under 35 U.S.C. §119(a) of Application No. 2005-298866 filed in Japan on Oct. 13, 2005. The entire contents of all of the above applications are hereby incorporated by reference.

BACKGROUND OF THE INVENTION

The present invention relates to a radio receiver, for example, to a microwave band radio receiver for receiving signals derived from broadcast waves which have been radio-transmitted in the microwave band.

Generally, a radio receiver includes a mixer which generates an intermediate frequency signal (hereinafter, referred to as IF signal) from a received radio modulation signal (hereinafter, referred to as RF signal) and a local oscillation signal (hereinafter, referred to as LO signal) generated in the receiver.

As for electric power of an LO signal to be inputted to the mixer and operating bias of the mixer, appropriate values points are chosen so that successful IF signal can be obtained by demodulation in terms of conversion gain, noise characteristics, low distortion or the like. The electric power of the LO signal is constant and, generally, large enough as compared with the electric power of the RF signal. Accordingly, the operating bias current of the mixer has a value dependent on the power of the LO signal, and hardly not on the power of the received RF signal, thus being a generally constant value.

In recent years, there have been energetically developed radio receivers using frequency bands of 10 GHz or higher microwave and milli-wave bands, and such radio receiver and radio reception method as shown below have been proposed (see, e.g., JP 2003-258655 A).

FIG. 10 shows the construction and frequency arrangement of a proposed radio receiver 900. The radio receiver 900 receives a radio multiplexed signal 930 transmitted from transmitter with an antenna 901. This radio multiplexed signal is formed from combination of a first local oscillation signal 930c (frequency: fLO1) and a first radio modulation signal 930a. This first radio modulation signal 930a, in which a first local oscillation signal 930c and a first intermediate frequency signal 932a (IF1 signal, frequency: fIF1) are multiplied, has a frequency of fLO1+fIF1.

The received radio multiplexed signal 930 has its unwanted waves eliminated by a filter 902, and amplified by an amplifier 903. Then, with the use of a mixer 905, the amplified radio signal and a second local oscillation signal (frequency: fLO2) generated from a local oscillator 904 inside the receiver are multiplied and down-converted, by which a first-local-oscillation-signal component signal 931c (frequency: fLO1−fLO2) and a first-radio-modulation-signal component signal 931a (frequency: fLO1+fIF1−fLO2) are generated.

Next, the signals, after the amplification by an amplifier 906, are divided by a divider 907, one being amplified by an amplifier 910 via a filter 908 allowing only the first-local-oscillation-signal component signal 931c and then inputted to a mixer 911, and the other being inputted to the mixer 911 via a filter 909 that allows only the first-radio-modulation-signal component signal 931a to pass through.

In the mixer 911, the first-local-oscillation-signal component signal 931c and the first-radio-modulation-signal component signal 931a are multiplied and down-converted, by which the IF1 signal 932a is demodulated. This is expressed by the following equation:

$$(fLO1+fIF1-fLO2)-(fLO1-fLO2)=fIF1$$

In this method, it is described that since frequency fluctuations and phase noise of the first local oscillation signal and the second local oscillation signal are canceled during the demodulation of the IF1 signal, there is no need for any high-performance oscillator so that the manufacturing cost can be reduced. Further, it is also described that since the first-local-oscillation-signal component signal 931c is amplified by the amplifier 910, a signal of sufficiently high level as an LO power can be fed to the mixer 911, so that the demodulation sensitivity can be enhanced.

However, with the above-described radio system, the LO power to be inputted to the mixer changes in proportion to the received power of the radio multiplexed signal 930. The LO power is small when the received power is small, while conversely the LO power is large when the received power is large. Therefore, with the use of a conventional mixer, the operating bias current of the mixer would largely change due to the received power of the radio multiplexed signal 930. As a result, in the case of transmission of digital terrestrial broadcasting or BS/CS television broadcasting waves, when the transmission distance is shortened so that the received power is enlarged, there would be some cases where the operating state of the mixer (operating bias) is changed, causing the reception C/N (carrier to noise ratio) to deteriorate or the mixer to be broken due to occurrence of a large current.

Moreover, when the operating bias of the mixer is so set as to prevent occurrence of the such troubles as described above even with a large received power, it would occur that the mixer does not operate when the received power is small, resulting in a small output of the mixer. In this case, the reception C/N could not be ensured and the transmission distance could not be elongated.

Consequently, with such a radio system, the dynamic range of the mixer would be narrowed so that stable reception C/N characteristics or image characteristics could not be obtained over a wide range of transmission distance in the radio system.

SUMMARY OF THE INVENTION

Accordingly, an object of the present invention is to provide a radio receiver for multiplying simultaneously transmitted first signal and second signal and subjecting the resulting signal to down conversion, the radio receiver having a wide dynamic range of the mixer so that stable image characteristics can be obtained over a wide range of transmission distance.

In order to achieve the above object, there is provided a radio receiver including a down-converter for receiving a radio multiplexed signal containing a first signal and a second signal and multiplying the first signal and the second signal by a mixer to down-convert the radio multiplexed signal and generate an intermediate frequency signal, wherein the mixer has a control section for controlling an operating bias of the mixer in response to a signal strength of at least either one of the first signal or the second signal.

According to the radio receiver of this invention, since the mixer has a control section for controlling the operating bias of the mixer in response to the signal strength of at least either one of the first signal or the second signal, the mixer can be controlled such that its operating bias current does not become excessive even if the received radio multiplexed signal has become large in strength. Thus, the mixer can be prevented from being broken. Also, whichever the received radio multiplexed signal is large or small in signal strength, the operating bias can be controlled so that the mixer will properly operate responsively. Thus, a successful reception C/N can be ensured over a wide range of transmission distance.

Also, there is provided a radio receiver including:

a first down-converter for receiving a radio multiplexed signal containing a first signal and a second signal and down-converting the received radio multiplexed signal by a local oscillation signal to generate a first intermediate frequency signal;

a second down-converter for multiplying the first signal and the second signal contained in the first intermediate frequency signal by a mixer to down-convert the first intermediate frequency signal and generate a second intermediate frequency signal, wherein the mixer has a control section for controlling an operating bias of the mixer in response to a signal strength of at least either one of the first signal or the second signal.

In this connection, though the first signal or the second signal to which the control section responds is contained in both the radio multiplexed signal and the first intermediate frequency signal, the control section may respond to the signal strength of any one of the signals.

According to the radio receiver of this invention, since the radio receiver includes the first down-converter and the second down-converter, the first signal and the second signal are frequency converted toward the lower frequency side by the first down-converter. Thus, the second down-converter may be formed of low-priced component parts. Also, when the received signal is large in signal strength, such control can be exerted by the second down-converter that the operating bias current of the mixer does not become excessive even if the received radio multiplexed signal has become large in strength. Thus, the mixer itself can be prevented from being broken. Also, whichever the received radio multiplexed signal is large or small in signal strength, the operating bias can be controlled so that the mixer will properly operate responsively. Thus, a successful reception C/N can be ensured over a wide range of transmission distance.

In one embodiment,
the second down-converter has:
a first path;
a second path; and
a divider for dividing the first intermediate frequency signal into the first path and the second path, and wherein
the first path transmits to the mixer the first intermediate frequency signal derived from the divider,
the second path has a filter for extracting the second signal from the first intermediate frequency signal and an amplifier for amplifying the second signal extracted from the filter, and transmits the amplified second signal to the mixer.

According to the radio receiver of this embodiment, since the second path has a filter for extracting the second signal from the first intermediate frequency signal and an amplifier for amplifying the second signal extracted from the filter, and transmits the amplified second signal to the mixer, the second signal, which becomes an LO power to be inputted to the mixer of the second down-converter, can be amplified so that the demodulation sensitivity of the mixer can be enhanced. Therefore, the transmission distance with successful reception C/N ensured can be further elongated.

In one embodiment,
the second down-converter has:
a first path;
a second path; and
a divider for dividing the first intermediate frequency signal into the first path and the second path, and wherein
the first path has an amplifier for amplifying the first intermediate frequency signal, and transmits the amplified first intermediate frequency signal to the mixer, and
the second path has a filter for extracting the second signal from the first intermediate frequency signal and an amplifier for amplifying the second signal extracted from the filter, and transmits the amplified second signal to the mixer.

According to the radio receiver of this embodiment, since each of the first path and the second path has the amplifier, occurrence of loop oscillation can be prevented by the isolation functions of the amplifiers.

In one embodiment,
the second down-converter has:
a first path;
a second path;
a third path; and
a divider for dividing the first intermediate frequency signal into the first path, the second path and the third path, and wherein
the first path has a filter for extracting a specified-band signal from the first intermediate frequency signal, and transmits the specified-band signal to a first said mixer,
the second path has a filter for extracting a specified-band signal from the first intermediate frequency signal, and transmits the specified-band signal to a second said mixer, and
the third path has a filter for extracting the second signal from the first intermediate frequency signal and an amplifier for amplifying the second signal extracted from the filter, and transmits the amplified second signal to the first and second mixers.

According to the radio receiver of this embodiment, since each of the first path and the second path has the filter, the first intermediate frequency signal can be band-divided by each of the first path and the second path. Thus, by performing second down-convert simultaneously in a plurality of different narrow bands, deterioration of the C/N characteristic and deterioration of the harmonic distortion characteristic can be reduced.

In one embodiment, the mixer has a microwave transistor.

According to the radio receiver of this embodiment, since the mixer has a microwave transistor, frequency conversion characteristics of the mixer can be controlled by bias control, and moreover isolation between input and output can be obtained. Thus, the amount of input signal leakage to the output signal is extremely small, making it possible to achieve a high-quality frequency conversion which involves less unwanted wave components in the output signal as well as less deterioration of the C/N characteristic and less deterioration of the harmonic distortion characteristic of the signal.

In one embodiment, the mixer is a base injection type mixer for injecting the first signal and the second signal to a base of the microwave transistor.

According to the radio receiver of this embodiment, since the mixer, which is so designed that the first signal and the second signal are inputted from the base side, has also an amplification function, less signal strength is sufficient for the input port of the mixer to achieve the frequency conversion. As a result, the transmission distance can be elongated.

In one embodiment, the control section has a resistor, and the resistor controls a current generated from the mixer to control an operating bias of the mixer.

According to the radio receiver of this embodiment, since the control section has the resistor, the operating bias of the mixer can be controlled with a very simple construction. Thus, downsizing and cost reduction of the mixer becomes achievable.

In one embodiment, the control section has a resistor, and the resistor has 10 kΩ or more and is connected to a base terminal of the microwave transistor, and the resistor controls a current generated from the mixer to control an operating bias of the mixer.

According to the radio receiver of this embodiment, since the control section has the resistor, the operating bias of the mixer can be controlled with a very simple construction. Thus, downsizing and cost reduction of the mixer becomes achievable.

Also, even if the signal inputted to the transistor has become large, the bias voltage applied to the base terminal of the transistor is lowered with a voltage drop by the resistor, so that breakage of the transistor due to an excessive current can be prevented. Further, since the amplification function of the mixer also lowers with the bias voltage lowered, the mixer is less liable to distortions so that deterioration of the C/N characteristic as well as deterioration of the characteristics due to harmonic distortions can be prevented.

In one embodiment, the control section has a resistor, and the resistor has 100Ω or more and is connected to an emitter terminal of the microwave transistor, and the resistor controls a current generated from the mixer to control an operating bias of the mixer.

According to the radio receiver of this embodiment, since the control section has the resistor, the operating bias of the mixer can be controlled with a very simple construction. Thus, downsizing and cost reduction of the mixer becomes achievable.

Also, even if the signal inputted to the transistor has become large, the base-emitter voltage applied to the transistor is lowered with a voltage drop by the resistor, so that breakage of the transistor due to an excessive current can be prevented. Further, since the amplification function of the mixer also lowers, the mixer is less liable to distortions so that deterioration of the C/N characteristic as well as deterioration of the characteristics due to harmonic distortions can be prevented. When the transistor is an FET or the like, the base may well be replaced with the gate, and the emitter with the source.

According to the radio receiver of this invention, since such control can be exerted that the operating bias current of the mixer does not become excessive even if the received radio multiplexed signal has become large in strength, breakage of the mixer can be prevented. Also, whichever the received radio multiplexed signal is large or small in signal strength, the operating bias can be controlled so that the mixer will properly operate responsively. Thus, a successful reception C/N can be ensured over a wide range of transmission distance.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIG. 1 is a configurational diagram of a microwave-band radio communication system according to a first embodiment of the present invention;

FIG. 2A is a frequency arrangement view of an input signal;

FIG. 2B is a frequency arrangement view of a first IF multiplexed signal;

FIG. 2C is a frequency arrangement view of a radio multiplexed signal which is an output signal;

FIG. 7 is a configurational diagram of a milli-wave receiver according to a third embodiment of the invention;

DETAILED DESCRIPTION OF THE INVENTION

Figure 3A:
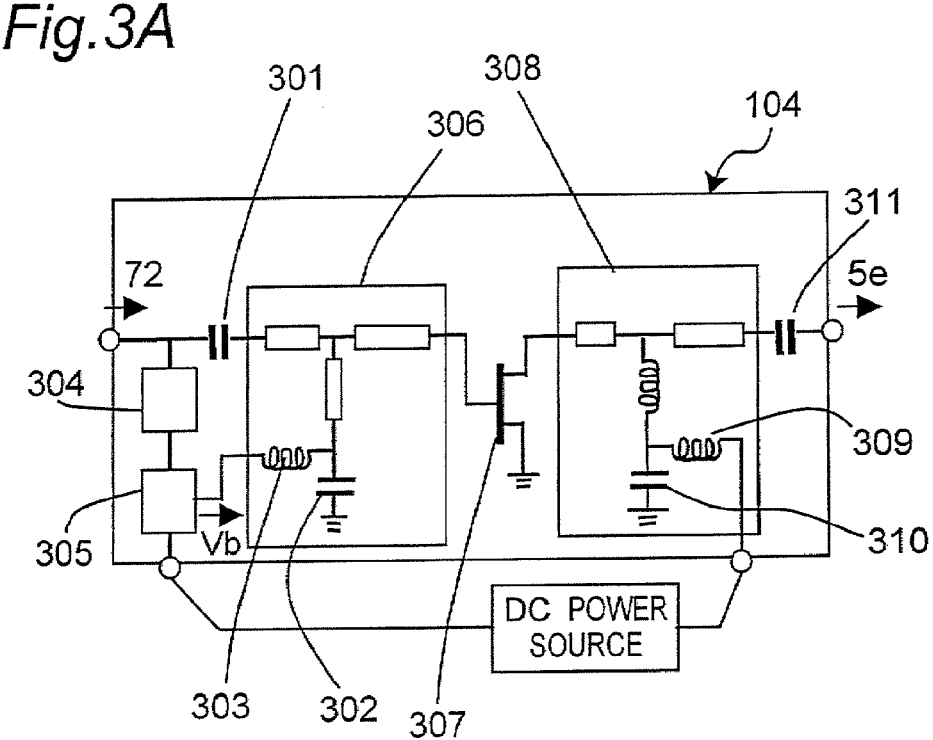
FIG. 3A is a circuit configuration diagram of a mixer.

Hereinbelow, the present invention will be described in detail by way of embodiments thereof illustrated in the accompanying drawings.

First Embodiment

FIG. 1 shows a configurational diagram of a microwave-band radio communication system according to a first embodiment of the present invention. Also, FIG. 2A shows a frequency arrangement view of an input signal 5e of a transmitter. FIG. 2B shows a frequency arrangement view of a first IF multiplexed signal 71d. FIG. 2C is a frequency arrangement view of a radio multiplexed signal 72 which is an output signal of the transmitter.

As shown in FIG. 1, a milli-wave band radio transmitter 9 which is an example of a microwave-band radio transmitter includes a frequency arrangement section 5, a first frequency conversion circuit 2a as an example of an intermediate frequency conversion means, a reference signal source 2c, a reference signal adding circuit 2d as an example of a multiplexed signal generation means, and a milli-wave frequency conversion circuit 3a as an example of a transmission-side frequency conversion means.

According to the frequency arrangement section 5, an input modulated-wave signal 5a derived from a terrestrial broadcasting antenna 1a and an input modulated-wave signal 5b derived from a satellite broadcasting antenna 1b are adjusted by amplifiers 51, 52, respectively, so that total power levels of the respective modulated input signals 5a, 5b become generally equal to each other, and through power combining and frequency arrangement by a mixer 53, by which a signal of one series 5e (frequency: fIF1e) is generated.

In this case, if the modulated input signal 5a and the modulated input signal 5b are of the same frequency band, it is impossible to do direct power combining of those signals. Therefore, after either one of the modulated input signals is frequency converted, the power combining of the signals is performed, by which signal of one series 5e (fIF1e) is generated.

In this embodiment, since the modulated input signals 5a, 5b are different in frequency band from each other, the signals are merged together as they are by the mixer 53. Also, although the modulated input signals 5a, 5b are adjusted so that their total power levels become generally equal to each other in the above case, it is also possible that the power combining may be done also by different power levels depending on the quality of modulated input signals.

Next, the signal of one series 5e (fIF1e) arranged on the frequency axis is amplified and adjusted to a proper level by an amplifier 20, and inputted to a frequency mixer 21, where the signal is subjected to a first frequency conversion. Only the single side-band of a first IF signal 71a resulting from the frequency conversion is passed through a filter 22 and adjusted to a proper level by an amplifier (or a combination with an attenuator as required) 23. Meanwhile, a reference signal 71c (frequency: fLO1) adjusted to the proper level is added by a power combiner 24a, by which an intermediate frequency multiplexed signal 71d (frequency allocated signal) is generated. This will hereinafter be referred to as first IF multiplexed signal 71d.

In this case, the reference signal source 2c having the frequency fLO1 is divided in two by a power divider 24b, so that one signal is inputted as a local oscillation signal source for the frequency mixer 21. Also, the power-divided signal is inputted to a level controller 95 and, after being controlled to a later-described proper level, inputted to the power combiner 24a as the reference signal 71c. Then, the signal is subjected to power combining with the first IF signal 71a, by which the first IF multiplexed signal 71d is generated. With such a configuration as shown above, since the reference signal 71c is added after the first IF signal 71a is controlled in level by the amplifier 23 or other level control means, the amplifier 23 is enabled to amplify the small-level first IF signal 71a alone linearly with high efficiency without being distorted by the large-level reference signal 71c.

Besides, the power level of the first IF signal 71a contained in the first IF multiplexed signal 71d and the power level of the reference signal 71c are controlled independently of each other by the amplifier (or a combination with an attenuator as required) 23 and by the level controller 95, respectively and thus the ratio of both the power levels is controlled, so that the transmission-side millimeter wave frequency conversion circuit 3a can be driven more linearly with full power.

Moreover, it is necessary to set, preliminarily on the transmission side, an optimum power division ratio of (power of the first IF signal 71a)/(power of the reference signal 71c) for high reception sensitivity at the stage of generating the first IF multiplexed signal 71d. This makes it possible to enhance the frequency conversion efficiency (reception sensitivity) and enlarge the radio transmission distance.

It is noted that, as an example of this embodiment, the attenuator in the level controller 95 or in the level control section used in the amplifier 23 is a chip-component resistor which is implemented by a T-type attenuator n-type attenuator. Also, the power combiner 24a and the power divider 24b in the reference signal adding circuit 2d are desirably Wilkinson combiners in which their output ports have mutual isolation characteristics. As a result of this, signals leaking to individual output ports can be suppressed, thus allowing individual functional circuits to operate normally. More specifically, by the Wilkinson type power combiner 24a, power divider 24b and the amplifier 23, it becomes possible to prevent the signal leakage of the first IF signal 71a to the reference signal adding circuit 2d side as well as the back flow of the added reference signal 71c to the frequency mixer 21.

In this case, in the frequency conversion, the first IF signal 71a after frequency conversion is inverted in frequency characteristic desirably by using a lower side-band signal. As a result of this inversion, the first IF signal 71a, which is a wide-band signal, can be improved in frequency characteristics (frequency flatness) regarding frequency conversion and amplification in the amplifier 23 having a level control function as well as on the up-convert (on the transmitter side) and down-convert (on the receiver side) to and from the milli-wave band in the succeeding stages.

As to the reason of this, generally, at high frequencies of the semi-microwave band (UHF band) or higher, the level of signal of one series is lower in loss (larger in gain for amplification) on the lower-frequency side than on the higher-frequency side during frequency conversion process or amplification process of the transmitter 9 and a receiver 100, and larger in loss (smaller in gain for amplification) on the higher-frequency side.

Accordingly, the level of signal, depicted in a signal strength level (vertical axis) versus frequency (horizontal axis) graph, shows a rightward-decreasing characteristic, dissimilar to an ideal flat frequency characteristic. Further, the modulated input signal 5e (fIF1e) itself to be inputted to the transmitter 9, generally being a wide-band signal that is a multi-channel image signal of one series, is generally, in many cases, a modulation signal which has a level difference between higher-frequency side and lower-frequency side with the higher side lowered in level due to the cable length and the frequency characteristics of the connector and booster amplifiers 51, 52.

In order to improve such a frequency characteristic (i.e., obtain a flat characteristic), the lower-side wave band is used by the first frequency conversion on the transmission side (more specifically, the lower-side wave band is selected by the filter 22), by which the higher and lower side of frequency characteristics to be subjected to frequency conversion can be reversed. That is, in the steps subsequent to the first frequency conversion 2a, to the signal that has been subjected to the inversion between lower and high frequency side, such characteristics are added as larger loss (smaller gain) on the higher frequency side of the signal and smaller loss (larger gain) on the lower frequency side, so that the frequency characteristic is compensated so as to become a flatter characteristic.

Accordingly, in the generation step for the first IF multiplexed signal 71d, such a conversion to signal frequency arrangement (shown below) as shown in FIGS. 2A and 2B is effected:

First IF reference signal 71c: fLO1

First IF signal 71a: fLO1−fIF1e

The local oscillation signal that has been used for the frequency conversion is divided and added as the reference signal 71c to the inverted first IF signal 71a, making it possible to improve the frequency characteristic in the following processing steps (amplification and frequency conversion). That is, in the following steps of frequency conversion and amplification, to the signal that has been subjected to the inversion between lower and high frequency side, such characteristics are added as larger loss (smaller gain) on the higher frequency side of the signal and smaller loss (larger gain) on the lower frequency side, so that the frequency characteristic comes to be a flatter characteristic.

Thereafter, the first IF multiplexed signal 71d is inputted to the milli-wave frequency conversion circuit 3a as shown in FIG. 1, and up-converted in frequency to a microwave band (milli-wave band in this embodiment) by a local oscillator 7 (local oscillation frequency: fLO2) and a frequency mixer 31, and then a desired multiplexed signal is let to pass through a band-pass filter 32. This frequency conversion to the milli-wave band is done by using the upper side-band signal for the above-described improvement of frequency characteristics. Then, the multiplexed signal, after amplified by a milli-wave amplifier 33, is radiated to the space as the radio multiplexed signal 72 of the milli-wave band by a transmitting antenna 4.

In this case, the transmitting antenna 4 and the milli-wave amplifier 33 constitute a transmitting means. In addition, as one desirable embodiment, by using an N-th (where N is a natural number of 2 or more) order harmonic mixer such as an even harmonic mixer, the local oscillation frequency of the local oscillator 7 can be set to 1/N for the frequency mixer 31. For example, by using a second harmonic mixer, the local oscillation frequency of the local oscillator 7 can be set to ½. With a milli-wave transmitter/receiver in which the transmitting/received radio signal 72 is of the 60 GHz band, the frequency of the local oscillator 7 has only to be of the 25 to 30 GHz band, and direct oscillation on the 60 GHz band is not required. Therefore, a transmitter of high frequency stability can be simply manufactured with an easy mounting by wire bonding or the like.

The generation process for the milli-wave radio multiplexed signal 72 is converted into such a signal frequency arrangement (shown below) as shown in FIG. 2C:

radio reference signal 72c: fLO1+fLO2
radio signal 72a: fLO1+fLO2−fIF1e

Next, the receiver of the present invention is explained. As shown in FIG. 1, the radio receiver 100 includes a receiving antenna 101 and a down-converter 110. This down-converter 110 includes an amplifier 102, a filter 103 and a mixer 104. In the radio receiver 100, the radio multiplexed signal 72 received by the receiving antenna 101 is amplified by the amplifier 102, and thereafter has its extraband unwanted waves eliminated by the filter 103, being inputted to the mixer 104. A radio signal 72a (as a first signal) and a radio reference signal 72c (as a second signal) contained in the radio multiplexed signal 72 are multiplied and down-converted by the mixer 104, by which an modulated input signal 5e (fIF1e) (as an intermediate frequency signal) is demodulated. More specifically, the signals are multiplied and down-converted by the step below.

$$(fLO1+fLO2)-(fLO1+fLO2-fIF1e)=fIF1e$$

The demodulated input signal 5e is, as required, filtered and amplified by a filter 172 and an amplifier 195, respectively, separated or divided by a separator 190 (or divider 190), and connected to electronic equipment 38, for example, to a satellite broadcasting/terrestrial broadcasting tuner 39 in the TV receiving set.

Next, FIG. 3A shows a circuit configuration diagram of the mixer 104. This mixer 104 has capacitors 301, 302, 310, 311, inductors 303, 309, a detector circuit 304, a bias control circuit 305, an input matching circuit 306, a transistor 307 and an output matching circuit 308. A DC bias is applied to the transistor 307 by the capacitors 301, 302, 310, 311 and the inductors 303, 309. Also, the input matching circuit 306 and the output matching circuit 308 are made up of transmission lines and such elements as inductors and capacitors so that the radio multiplexed signal 72 and the modulated input signal 5e can be inputted to and outputted from the transistor 307 usefully.

The transistor 307 demodulates the modulated input signal 5e from the radio multiplexed signal 72 by a nonlinear operation. The radio multiplexed signal 72 inputted to the mixer 104 is divided so that one is inputted to the detector circuit 304 while the other is inputted to the transistor side.

The detector circuit 304 detects the radio multiplexed signal 72 to output a DC voltage corresponding to its signal strength. A base (gate) bias voltage of the transistor is fed from the bias control circuit 305. The detector circuit 304 detects the envelope of the radio multiplexed signal 72 inputted to the mixer 104 to output a DC voltage corresponding to its signal strength. The detector circuit 304 can be made up by using a diode, a transistor and the like.

The bias control circuit 305 controls a constant voltage fed from a DC power source depending on an output voltage of the detector circuit 304 to feed a base (gate) voltage Vb to the base (gate) terminal of the transistor 307.

In this connection, such a base (gate) voltage Vb that no overcurrent occurs to the transistor 307 at each input level of the radio multiplexed signal 72 inputted to the transistor and that the modulated input signal Se is outputted with less distortion and a better C/N characteristic is measured in advance, and then the bias control circuit 305 is designed so as to operate to output the above base voltage Vb. In general, Vb is designed so as to be lower for a large input signal strength, and to be higher for a small input signal strength. The bias control circuit 305 may be either an analog circuit or a digital circuit.

With the arrangement shown above, the reception C/N can be ensured whichever the received signal strength is large or small, so that the radio device can be used over a wide range of transmission distance. Also, even when the received signal strength becomes excessively large, excessive increase in the operating current of the transistor 307 can be suppressed so that the transistor can be prevented from being broken.

The mixer 104 is, desirably, provided in the form of an MMIC (Monolithic Microwave Integrated Circuit) on a GaAs substrate which involves less loss in the milli-wave band because the milli-wave band signal is frequency converted. However, this is no limitative, and individual chip elements may be formed as hybrid ones. Further, the transistor 307 may be either a HEMT (High-Electron-Mobility Transistor) device or a bipolar transistor.

That is, the mixer 104 has a control section for controlling the operating bias of the mixer 104 in response to the signal strength of at least either one of the first signal or the second signal. The mixer 104, having a microwave transistor 307, is a base injection type mixer for injecting the first signal and the second signal to the base of the microwave transistor 307. The control section has the bias control circuit 305.

Figure 3B:
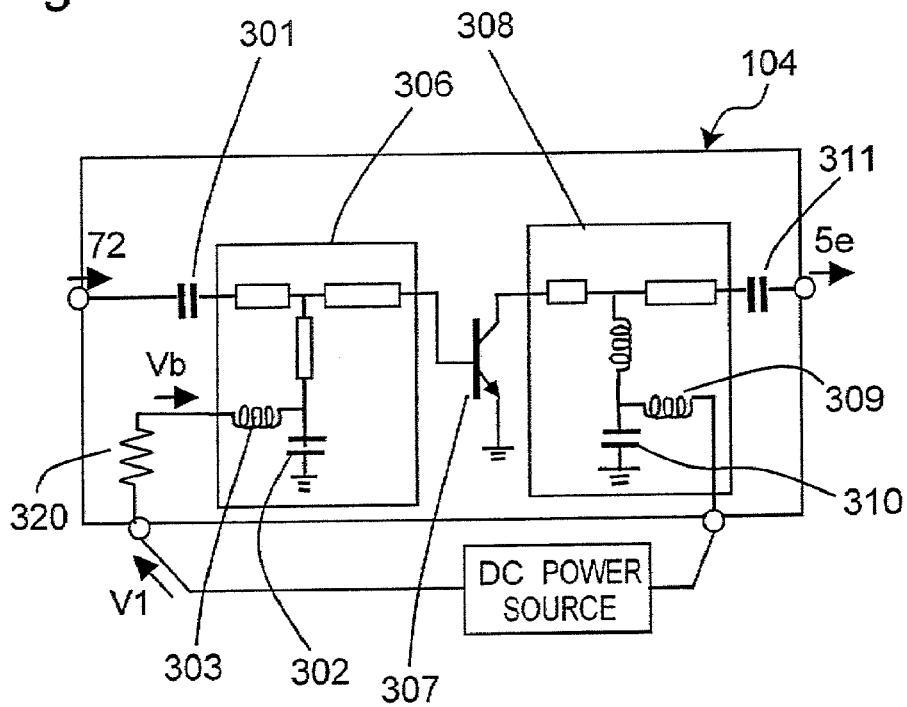
FIG. 3B is a circuit configuration diagram of another mixer.

FIG. 3B shows a circuit configuration diagram of a mixer 104 according to another embodiment. This embodiment differs from that of FIG. 3A in that the detector circuit 304 and the bias control circuit 305 are replaced with a resistor 320. Also, the transistor 307 is formed of a bipolar transistor. It is noted that like parts in conjunction with FIG. 3A are designated by like reference numerals and their detailed description is omitted.

The principle in which the operating bias of the mixer is controlled by the resistor 320 is explained below.

The base (gate) voltage Vb to be applied to the transistor 307 has the following relation with a constant voltage V1 fed from the DC power source, a base current Ib of the transistor and a resistance value R of the resistor 320:

$$Vb = V1 - Ib \times R$$

In this case, as the radio multiplexed signal 72 inputted to the transistor 307 increases in strength, the base current Ib tends to increase due to the nonlinear operation of the transistor 307 responsively. However, as the base current Ib is going to increase, a voltage drop is caused by the resistor 320, acting to decrease the base voltage Vb. A decrease in the base voltage Vb causes the base current Ib to decrease.

As a result of the above actions, the base current Ib does not increase so much even if the inputted radio multiplexed signal 72 is increased in strength. Thus, the resistor 320 can control so that even if the power of the signal inputted to the transistor 307 has become large, the operating bias current of the mixer does not become excessive. Thus, the mixer in itself can be prevented from being broken.

In addition, since the amplification of the transistor is weakened by a decrease of Vb, harmonic distortion is less likely to occur to the outputted modulated input signal 5e, with the result that the C/N characteristic is improved. Also, in the case where the input signal strength is small, the base current Ib is small and subject to almost no changes, thus it is desirable that the fed DC power supply voltage V1 be set to such a value that the mixer can operate even when the input level is low and can output the modulated input signal 5e having the best C/N characteristic.

Although the value of the resistor 320 is set to 20 kΩ in this embodiment, yet the value is preferably 10 kΩ or more to obtain effects larger than experimental results. Also, the resistance value is desirably 100 kΩ or less. In such a case, since the set value of the DC power supply voltage V1 does not become high, the power consumption can be reduced.

That is, the control section has the resistor 320, and the resistor 320, having 10 kΩ or more, is connected to the base terminal of the microwave transistor 307, thus the resistor 320 acting to control the current derived from the mixer 104 to thereby control the operating bias of the mixer 104.

Accordingly, the operating bias of the mixer 104 can be controlled with a very simple construction comprising only the resistor 320, hence giving a great advantage for downsizing and cost reduction of the receiver device and the mixer 104.

Figure 3C:
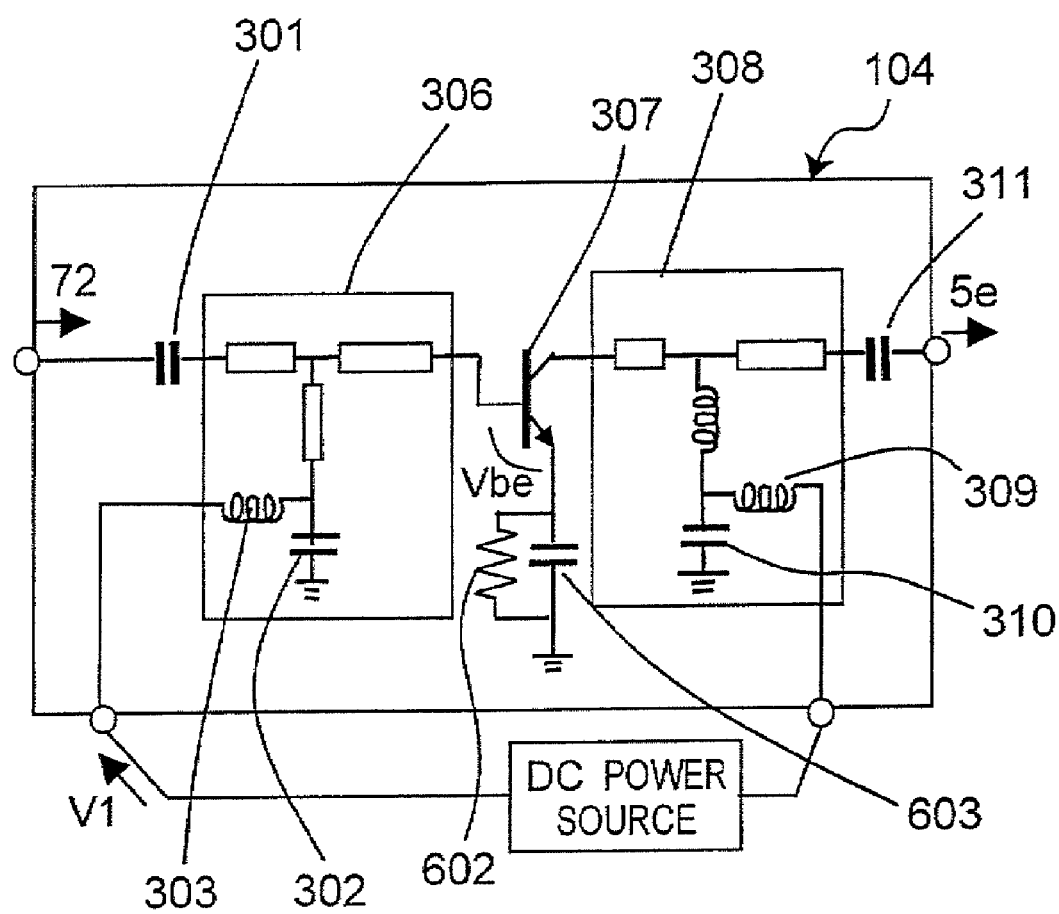
FIG. 3C is a circuit configuration diagram of another mixer.

FIG. 3C shows a circuit configuration diagram of a mixer 104 according to another embodiment. This embodiment differs from that of FIG. 3B in that the resistor is connected not to the base terminal but to the emitter terminal. It is noted that like parts in conjunction with FIG. 3B are designated by like reference numerals and their detailed description is omitted.

The base terminal of the microwave transistor 307 is directly connected to the DC power source, and its emitter terminal is grounded via a parallel connection of a resistor 602 and a capacitor 603 for use of high frequency passage. The capacitor 603 for use of high frequency passage prevents the high-frequency signal from flowing to the resistor 602, thus inhibiting occurrence of attenuation and deterioration of the high-frequency signal.

Now the principle in which the operating bias of the mixer is controlled by the resistor 602 is explained below.

The base-emitter voltage Vbe to be applied to the transistor 307 has the following relation with a constant voltage V1 fed from the DC power source, an emitter current Ie of the transistor and a resistance value R1 of the resistor 602:

$$Vbe = V1 - Ie \times R1$$

In this case, as the radio multiplexed signal 72 inputted to the transistor 307 increases in strength, the emitter current Ie tends to increase due to the nonlinear operation of the transistor 307 responsively. However, as the emitter current Ie is going to increase, a voltage drop is caused by the resistor 602, acting to decrease a base-emitter voltage Vbe. A decrease in the base-emitter voltage Vbe causes the emitter current Ie to decrease.

As a result of the above actions, the emitter current Ie does not increase so much even if the inputted radio multiplexed signal 72 is increased in strength. Thus, the resistor 602 can control so that even if the power of the signal inputted to the transistor 307 has become large, the operating bias current of the mixer does not become excessive. Thus, the mixer in itself can be prevented from being broken.

In addition, since the amplification of the transistor is weakened by a decrease of Vbe, harmonic distortion is less likely to occur to the modulated input signal Se to be outputted, with the result that the C/N characteristic is improved. Also, in the case where the input signal strength is small, the emitter current Ie is small and subject to almost no changes, thus it is desirable that the fed DC power supply voltage V1 be set to such a value that the mixer can operate even when the input level is low and can output the modulated input signal 5e having the best C/N characteristic.

Since the current amplification factor β of the transistor 307 in this embodiment is about 100, setting the value of the resistance to be connected to the emitter terminal to 1/100 that of the case where the resistor is connected to the base terminal allows similar effects to be obtained.

Accordingly, in this embodiment, the value of the resistor 602 is set to 200Ω. The value is preferably 100Ω or more to obtain similar effects. Also, the resistance value is desirably set to 1 kΩ or less. In this case, since the set value of the DC power supply voltage V1 does not become high, the power consumption can be reduced.

That is, the control section has the resistor 602, and the resistor 602, being 100Ω or more, is connected to the emitter terminal of the microwave transistor 307, thus the resistor 602 acting to control the current derived from the mixer 104 to thereby control the operating bias of the mixer 104.

Accordingly, the operating bias of the mixer can be controlled with a very simple construction, hence giving a great advantage for downsizing and cost reduction of the receiver device and the mixer 104. Although this embodiment has been described on a case where the transistor 307 is a bipolar transistor, yet an FET or other like transistor may also be used. In such a case, the emitter terminal may well be replaced with the source terminal.

In the reception mode of this embodiment, on condition that the power dividing ratio of (power of the first IF signal 71a)/(power of the reference signal 71c) is about 1, an optimum transmission with high reception sensitivity (good reception C/N) is enabled and a maximum radio transmission distance can be achieved.

Second Embodiment

Figure 4:
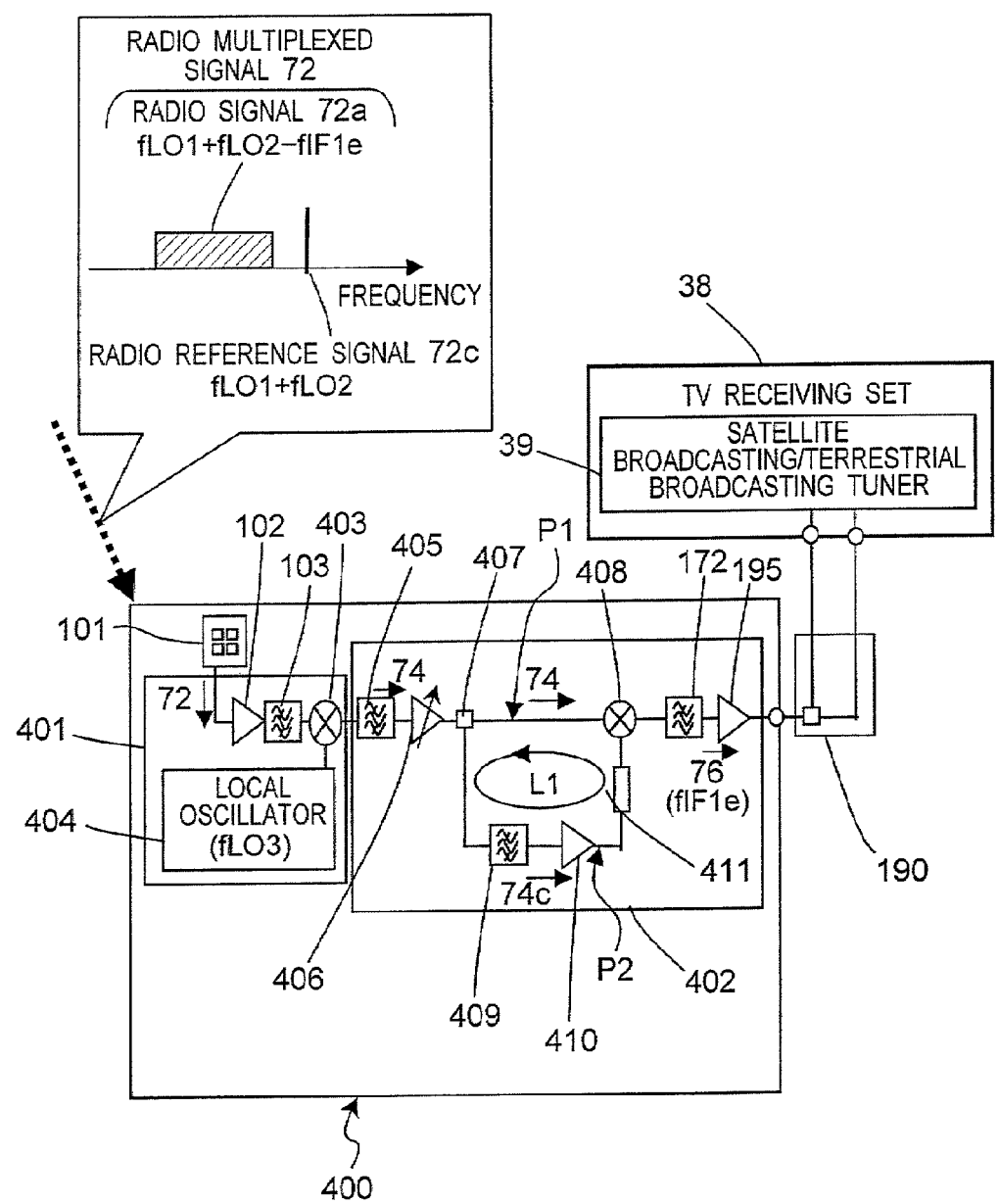
FIG. 4 is a configurational diagram of a milli-wave receiver according to a second embodiment of the invention.
Figure 5A:
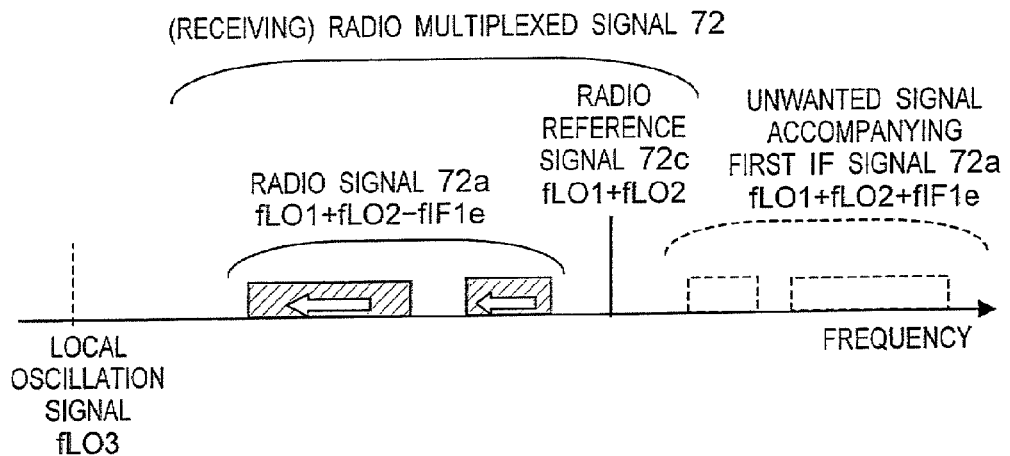
FIG. 5A is a frequency arrangement view of a radio multiplexed signal which is a received signal.
Figure 5B:
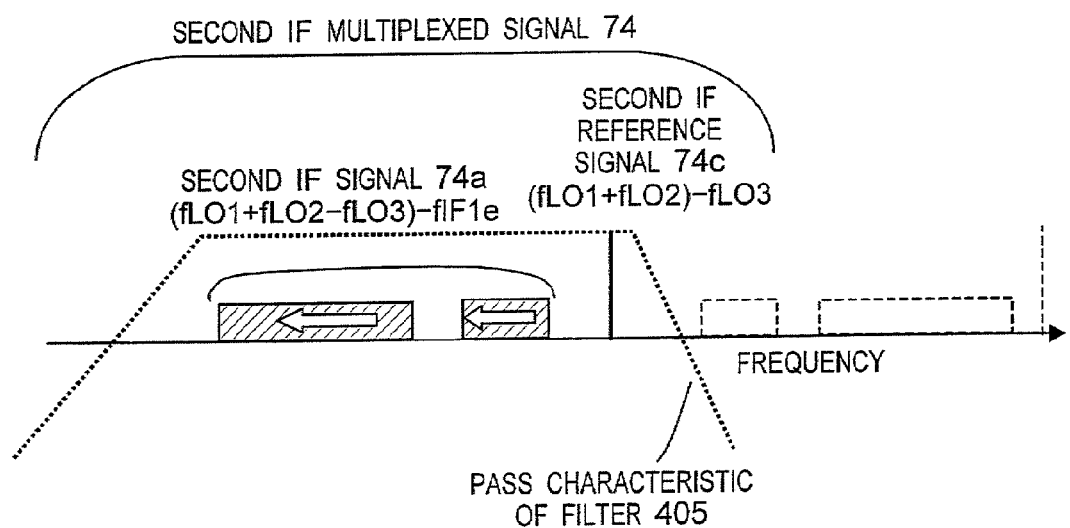
FIG. 5B is a frequency arrangement view of a second IF multiplexed signal.
Figure 5C:
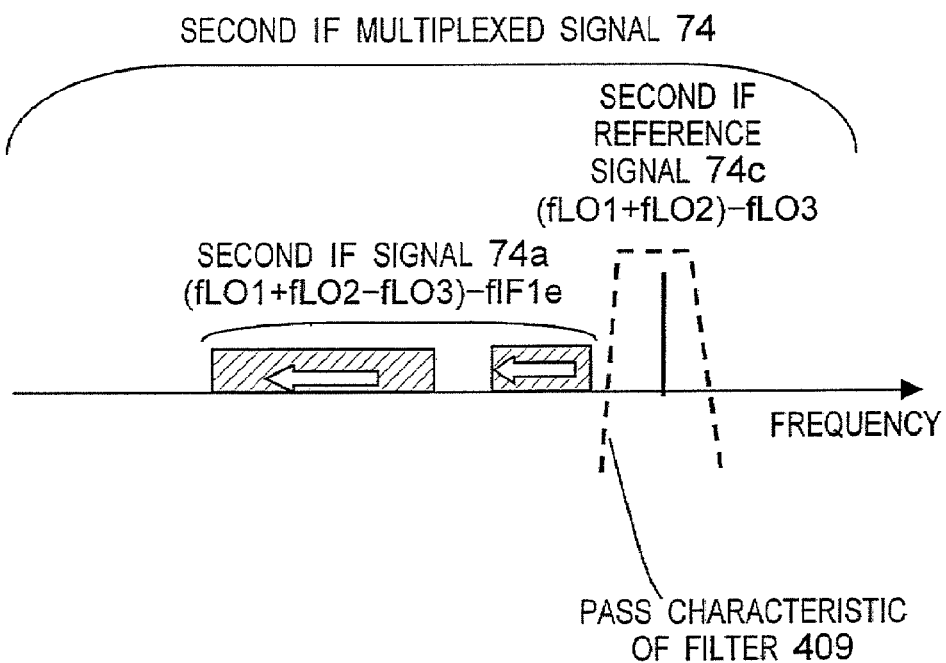
FIG. 5C is a frequency arrangement view of a second IF multiplexed signal.
Figure 5D:
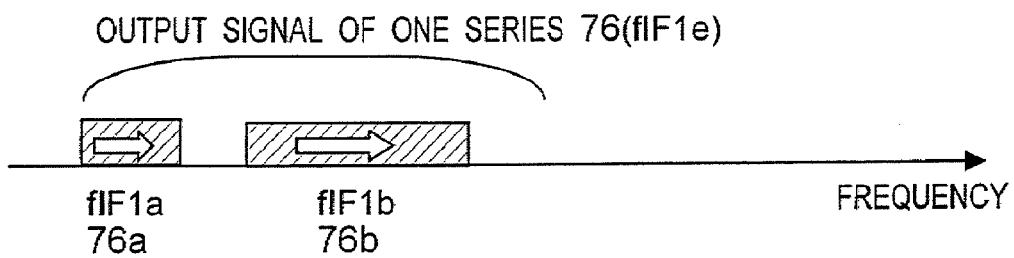
FIG. 5D is a frequency arrangement view of an output signal.

FIG. 4 shows a detailed configurational diagram of a milli-wave receiver according to a second embodiment of the invention. The construction of up to the transmitter 9 in this embodiment is similar to that of the first embodiment, its description being omitted, and a description on a receiver 400 is given below. Also, FIG. 5A shows a frequency arrangement view of a radio multiplexed signal 72 which is a received signal of the milli-wave receiver 400. FIGS. 5B and 5C show frequency arrangement views of a second IF multiplexed signal 74. FIG. 5D shows a frequency arrangement view of an output signal 76 (equivalent to the modulated input signal 5e).

This embodiment differs from the first embodiment in that before the output signal 76 is demodulated, the radio multiplexed signal 72 is once down-converted by a local oscillator (oscillation frequency: fLO3) to generate a second IF multiplexed signal 74.

As shown in FIG. 4, the radio receiver 400 includes a receiving antenna 101, and a first down-converter 401 and a second down-converter 402.

First, the first down-converter 401 is explained. The first down-converter 401 includes an amplifier 102, a filter 103, a mixer 403 and a local oscillator 404.

In the radio receiver 400, a radio multiplexed signal 72 received by the receiving antenna 101 is amplified by the amplifier 102, and thereafter has its extraband unwanted waves eliminated by the filter 103, being inputted to the mixer 403. The mixer 403 down-converts the input signal by using a local oscillation signal (fLO3) generated from the local oscillator 404, and outputs a second IF multiplexed signal 74.

More specifically, the first down-converter 401 receives a radio multiplexed signal containing a radio signal 72a (as a first signal) and a radio reference signal 72c (as a second signal), and down-converts the received radio multiplexed signal by a local oscillation signal, thereby generating a second IF multiplexed signal 74 (as a first intermediate frequency signal).

In this embodiment, the second IF multiplexed signal 74 is set to fall within a range of about 2 to 5 GHz. In addition, as one desirable embodiment, by using an N-th (where N is a natural number of 2 or more) order harmonic mixer such as an even harmonic mixer, the local oscillation frequency of the local oscillator 404 can be set to 1/N for the mixer 403. For example, by using a second harmonic mixer, the local oscillation frequency of the local oscillator 404 can be set to ½.

With a milli-wave transmitter/receiver in which the transmitting/received radio signal 72 is of the 60 GHz band, the frequency of the local oscillator 404 has only to be of the 25 to 30 GHz band, and direct oscillation on the 60 GHz band is not required. Therefore, a transmitter of high frequency stability can be simply manufactured with an easy mounting by wire bonding or the like.

The generation process for the second IF multiplexed signal 74 results in such a signal frequency arrangement as shown in FIGS. 5A and 5B:

second IF reference signal 74c:

$$fLO1+fLO2-fLO3$$

second IF signal 74a:

$$fLO1+fLO2-fLO3-fIF1e$$

The second IF multiplexed signal 74 is composed of the second IF signal 74a and the second IF reference signal 74c. Also, in order that the frequency arrangement will not be inverted by the down-convert, it is desirable to set a relation that fLO1+fLO2>fLO3. Then, the frequency characteristics of the output signal 76 derived from the radio receiver 400 can be made flat.

Next, the second down-converter 402 as shown in FIG. 4 is explained.

The second down-converter 402 has a first path P1, a second path P2, and a divider 407 for dividing the first intermediate frequency signal into the first path P1 and the second path P2.

The first path P1 serves for transmitting to the mixer 408 a second IF multiplexed signal (as a first intermediate frequency signal) 74 derived from the divider 407.

The second path P2 has a filter 409 for extracting a second IF reference signal 74c (as a second signal) from the second IF multiplexed signal 74 (as a first intermediate frequency signal), and an amplifier 410 for amplifying the second IF reference signal 74c (as a second signal) extracted from the filter 409. Then, the amplified second IF reference signal 74c (as a second signal) is transmitted to the mixer 408.

In the second down-converter 402, the second IF multiplexed signal 74 outputted from the first down-converter 401 has its unwanted waves eliminated as required and amplified by a filter 405 and an amplifier 406, respectively.

Subsequently, the second IF multiplexed signal 74 is divided by the power divider 407 into two, one of which is inputted to the mixer 408. The other, passing through the band-pass filter 409 that allows only the second IF reference signal 74c to pass through, is amplified by the amplifier 410. The second IF reference signal 74c extracted and amplified by the band-pass filter is inputted to the mixer 408. In the mixer 408, the second IF signal 74a and the amplified second IF reference signal 74c are multiplied and down-converted, by which an output signal 76 is obtained.

That is, in the second down-converter 402, the second IF signal 74a (as a first signal) and the second IF reference signal 74c (as a second signal) both contained in the second IF multiplexed signal 74 (as a first intermediate frequency signal) are down-converted by the mixer 408, by which the output signal 76 (as a second intermediate frequency signal) is generated.

More specifically, the multiplication and down-convert are performed through the steps of FIGS. 5C and 5D and the following step:

$$(fLO1+fLO2-fLO3)-(fLO1+fLO2-fLO3-fIF1e)=fIF1e$$

As shown in FIG. 4, the demodulated output signal 76 is, as required, filtered and amplified by a filter 172 and an amplifier 195, respectively, separated or divided by a separator (or divider) 190, and connected to electronic equipment 38, for example, to a satellite broadcasting/terrestrial broadcasting tuner 39 in the TV receiving set.

Figure 6A:
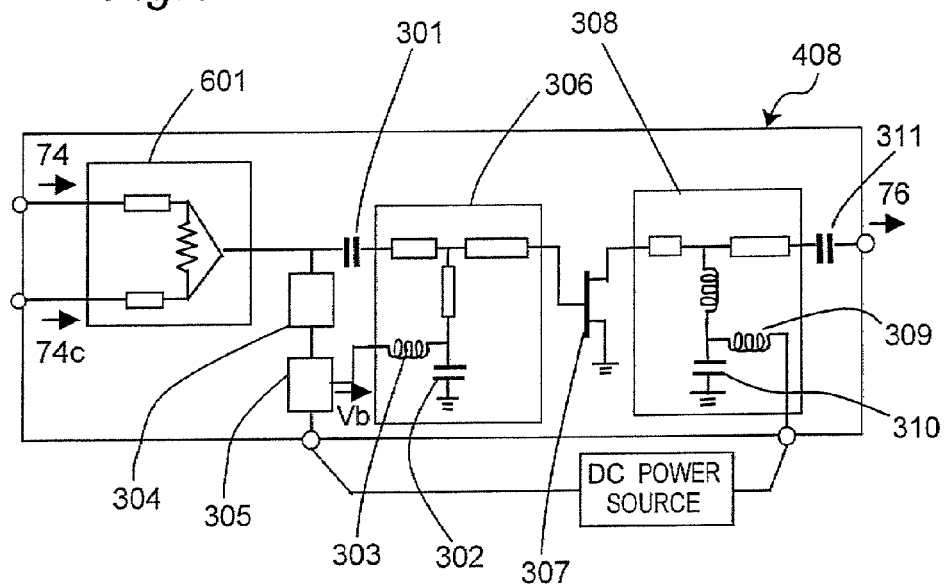
FIG. 6A is a circuit configuration diagram of a mixer.
Figure 6B:
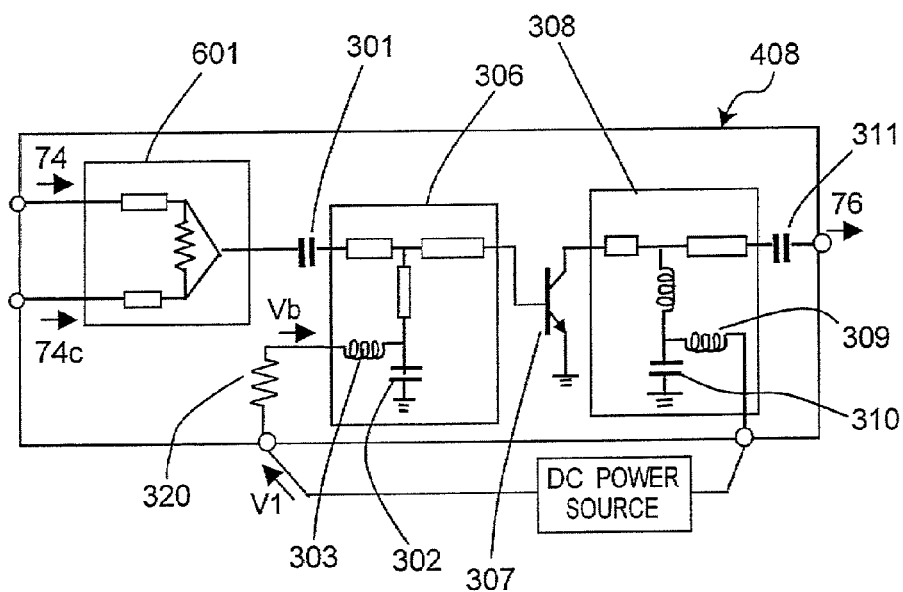
FIG. 6B is a circuit configuration diagram of another mixer.
Figure 6C:
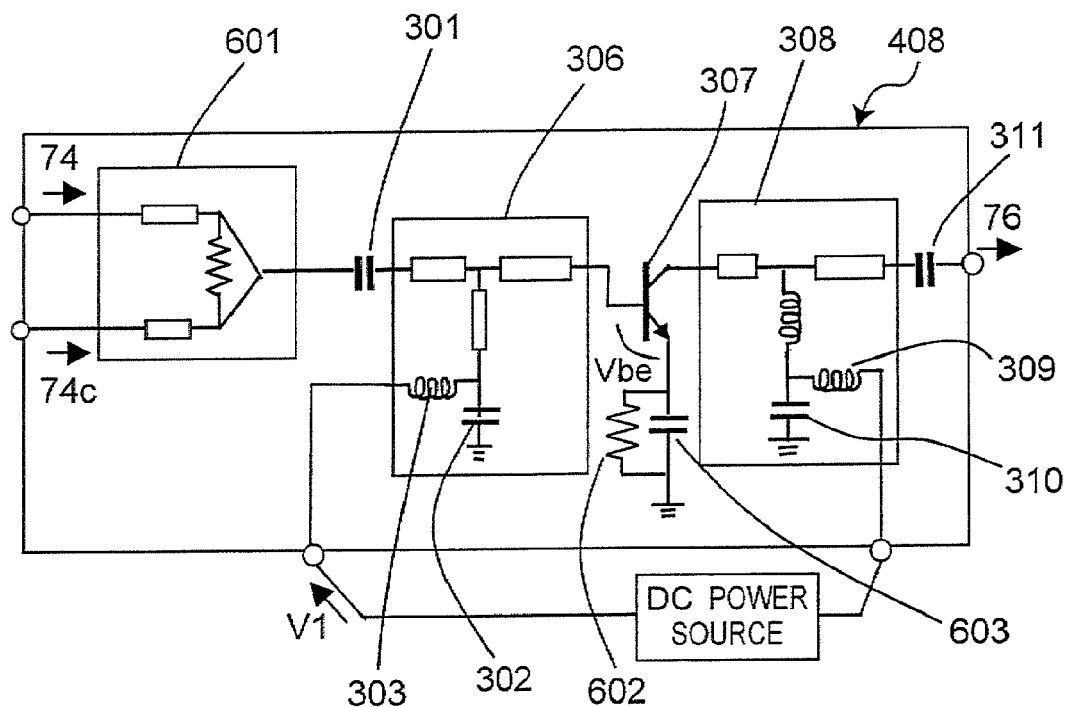
FIG. 6C is a circuit configuration diagram of another mixer.

Next, FIGS. 6A to 6C show circuit configuration diagrams of the mixer 408. The mixer of this embodiment differs from the mixer of the first embodiment shown in FIGS. 3A to 3C in that the inputted second IF multiplexed signal 74 and second IF reference signal 74c are combined in power with each other. It is noted that like parts in conjunction with FIGS. 3A to 3C are designated by like reference numerals and their detailed description is omitted.

First, the second IF multiplexed signal 74 and the second IF reference signal 74c inputted to the mixer 408 are combined together by a power combiner 601. The mixers shown hereinafter, although different in frequency band from those of the first embodiment (FIGS. 3A to 3C), yet are similar in construction to the mixer 104.

As an example, the mixer 408 shown in FIG. 6B is explained. When the combined second IF multiplexed signal 74 and second IF reference signal 74c are multiplied by the transistor 307, an output signal 76 is generated.

With the arrangement shown above, the operating bias of the mixer 408 can be controlled, and the reception C/N can be ensured whichever the received signal strength is large or small, so that the radio device can be used over a wide range of transmission distance. Also, even when the received signal strength becomes excessively large, excessive increase in the operating current of the transistor 307 can be suppressed so that the transistor 307 can be prevented from being broken.

Desirably, the mixer is a base injection type mixer for combining together and injecting the second IF multiplexed signal 74 and the second IF reference signal 74*c* to the base of the microwave transistor, as in this embodiment. The mixer, if provided in the base injection type, has an amplification function as well, thereby allowing the combined two signals to be amplified, so that less signal strength is sufficient for the input port of the mixer to achieve the frequency conversion. As a result, the transmission distance can be elongated.

Further, the power combiner 601 and the power divider 407 (See FIG. 4) are desirably Wilkinson power divider and combiner having isolation characteristics between their respective output ports. With the use of a loop 411 (See FIG. 4), occurrence of abnormal oscillations in the circuit can be made less likely to occur.

According to this embodiment, before the received output signal 76 is demodulated, the radio multiplexed signal 72 is once down-converted to generate a second IF multiplexed signal 74. Accordingly, the second down-converter 402 containing the mixer 408 treats relatively low frequency bands, and therefore can be made up with low-priced component parts. Also, as to the dividing ratio of power to be inputted to the mixer, (power of the second IF signal 74*a*)/(power of the second IF reference signal 74*c*), there exists an optimum condition of the dividing ratio for the mixer 408 to perform the down-convert with high reception sensitivity (good reception C/N). However, since the second IF reference signal 74*c* is amplified by the amplifier 410, the optimum power dividing ratio, (power of the first IF signal 71*a*)/(power of the reference signal 71*c*), can be set higher in advance at the stage of generation of the first IF multiplexed signal 71*d* on the transmitter side (as shown in FIGS. 1 and 2B). As a result of this, the frequency conversion efficiency (reception sensitivity) can be enhanced so that the radio transmission distance can be further enlarged.

In this embodiment, the second IF reference signal 74*c* is also contained in the second IF multiplexed signal 74 that passes through the first path P1. Also when this signal is frequency down-converted with the mixer 408 by using the second IF reference signal 74*c* that passes through the second path P2, some degree of DC current component occurs to the down-converted signal. By using this DC current component, the bias current of the mixer 408 can also be controlled. More specifically, the current generated by the down-convert changes depending on the reception sensitivity, i.e., a larger reception sensitivity causes a larger DC current to be generated and a smaller reception sensitivity causes a smaller DC current to be generated. Taking advantage of this allows the bias control for the mixer to be done. As a consequence, deterioration of the C/N characteristic and deterioration of the harmonic distortion characteristic can be reduced.

In this embodiment, the second IF multiplexed signal 74, after amplified by the amplifier 406, is divided by the power divider 407 into two, each of which is inputted to the mixer 408. Instead, only if the operating bias of the mixer 408 is controlled, an attenuator, a filter and an amplifier may also be inserted as required, and moreover the signal may be inputted to the mixer 408 without being divided. For example, a band-pass filter that allows only the second IF signal 74*a* to pass through may be inserted on the path P1.

Third Embodiment

FIG. 7 shows a detailed configurational diagram of a milli-wave receiver according to a third embodiment of the invention. The construction of the milli-wave transmitter 9 as well as component parts for generating the second IF multiplexed signal 74 from the receiver side milli-wave band in this embodiment are similar to that of the foregoing embodiment.

This embodiment differs from the second embodiment in that the second IF multiplexed signal 74 is divided by a second down-converter into two and both of the resulting two signals are amplified by an amplifier.

The second down-converter 402 has a first path P1, a second path P2, and a divider 407 for dividing a second IF multiplexed signal 74 (as a first intermediate frequency signal) into the first path P1 and the second path P2.

The first path P1 has an amplifier 701 for amplifying the second IF multiplexed signal 74 (as a first intermediate frequency signal). Then, the amplified second IF multiplexed signal 74 (as a first intermediate frequency signal) is transmitted to the mixer 408.

The second path P2 has a filter 409 for extracting the second IF reference signal 74*c* (as a second signal) from the second IF multiplexed signal 74 (as a first intermediate frequency signal), and an amplifier 410 for amplifying the second IF reference signal 74*c* (as a second signal) extracted from the filter 409. Then, the amplified second IF reference signal 74*c* (as a second signal) is transmitted to the mixer 408.

Then, in the second down-converter 402, after the first down-convert, the second IF multiplexed signal 74 has its unwanted waves eliminated as required by the filter 405. Subsequently, the second IF multiplexed signal 74 is divided by the power divider 407 into two signals, one of which is amplified by the amplifier 701 and, after adjusted in level, if necessary, by an attenuator 702, inputted to the mixer 408. The other signal, passing through the band-pass filter 409 that allows only the second IF reference signal 74*c* to pass through, is amplified by the amplifier 410, and the amplified second IF reference signal 74*c* is inputted to the mixer 408.

In the mixer 408, the amplified and level-adjusted second IF signal 74*a* and the amplified second IF reference signal 74*c* are multiplied and down-converted, by which an output signal 76 is obtained. The mixer 408 is similar in construction to that described in the second embodiment.

According to this arrangement, since both of the divided two paths P1 and P2 have the amplifiers 410, 701 connected thereto, feedback caused by the loop 411 can be suppressed by high isolation functions of the amplifiers 410, 701, making it possible to prevent occurrence of abnormal oscillations in the circuit.

Fourth Embodiment

Figure 8:
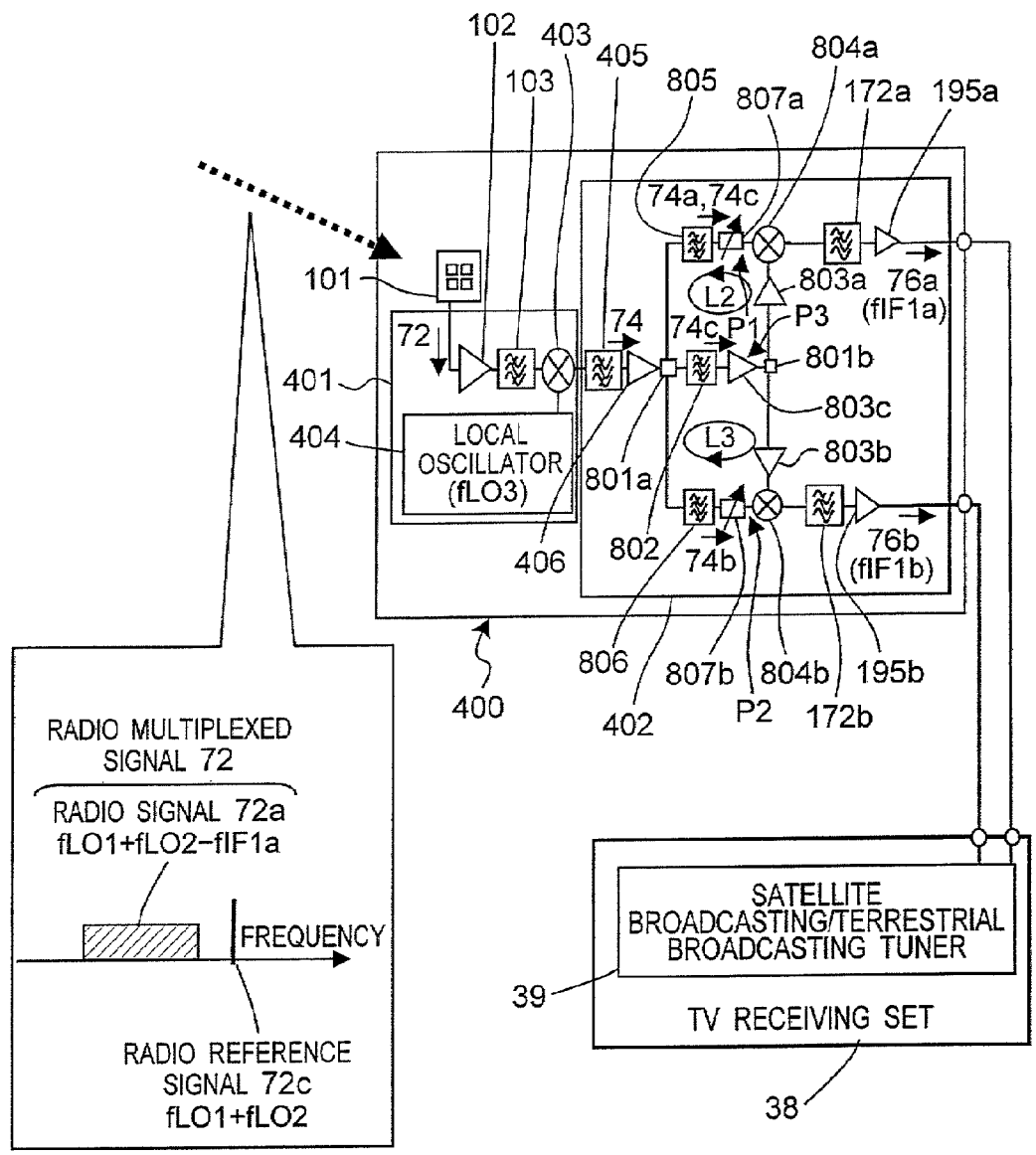
FIG. 8 is a configurational diagram of a milli-wave receiver according to a fourth embodiment of the invention.

FIG. 8 shows a detailed configurational diagram of a milli-wave receiver according to a fourth embodiment of the invention. The construction of the milli-wave transmitter 9 as well as component parts for generating the second IF multiplexed signal 74 from the receiver side milli-wave band in this embodiment are similar to that of the foregoing embodiment. This embodiment differs in the portion of the second down-converter, in which an output signal 76 is generated (reproduction of the modulated input signal 5*e*) from the second IF multiplexed signal 74 by frequency down-convert with the second IF reference signal 74*c* contained in the multiplexed signal.

The second down-converter 402 has a first path P1, a second path P2, a third path P3, and a divider 801*a* for dividing a second IF multiplexed signal 74 (as a first intermediate frequency signal) into the first path P1, the second path P2 and the third path P3.

The first path P1 has a filter 805 for extracting a signal of a specified band from the second IF multiplexed signal 74 (as a first intermediate frequency signal). Then, the specified-band signal is transmitted to the first mixer 804*a*.

The second path P2 has a filter 806 for extracting a specified-band signal from the second IF multiplexed signal 74 (as a first intermediate frequency signal). Then, the specified-band signal is transmitted to the second mixer 804b.

The third path P3 has a filter 802 for extracting a second IF reference signal 74c (as a second signal) from the second IF multiplexed signal 74 (as a first intermediate frequency signal), and amplifiers 803a, 803b, 803c for amplifying the second IF reference signal 74c (as a second signal) extracted from the filter 802. Then, the amplified second IF reference signal 74c (as a second signal) is transmitted to the first mixer 804a and the second mixer 804b.

Then, in the second down-converter 402, after the first down-convert, the second IF multiplexed signal 74 is allowed by the filter 405 to pass therethrough, thereafter amplified by the amplifier 406, and divided into three by the power divider 801a.

Thereafter, in the third path P3, the second IF reference signal 74c is extracted by the filter 802 that extracts the second IF reference signal 74c, and after amplification and dividing, the divided signals are amplified by the amplifiers 803a, 803b, respectively, thus resulting in local oscillation signals for the first mixer 804a and the second mixer 804b.

Meanwhile, a wanted signal waves contained in the second IF multiplexed signal 74 are band-divided by the filter 805 on the first path P1 and the filter 806 on the second path P2 according to characteristics of each filter 805 and 806.

Figure 9A:
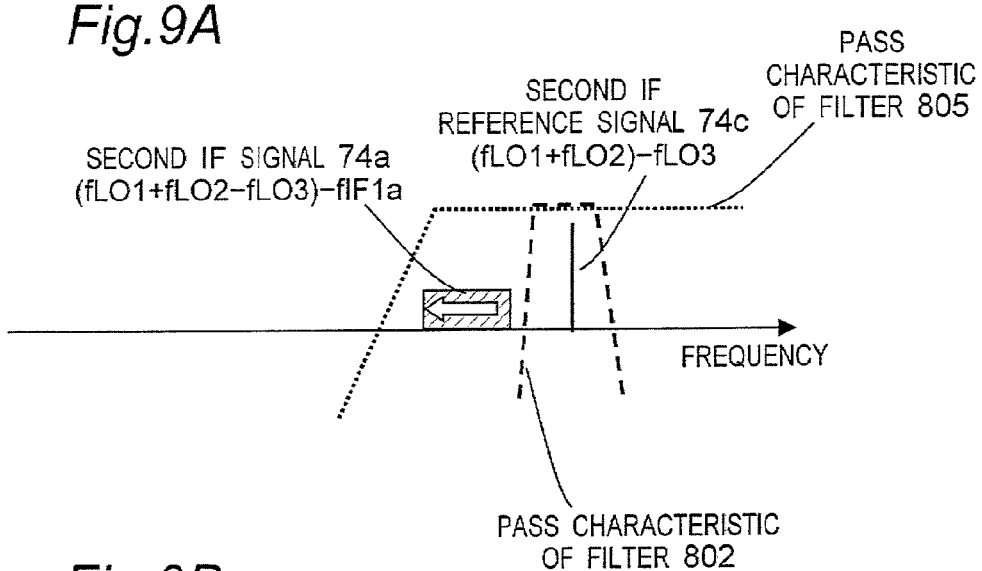
FIG. 9A is a frequency arrangement view of one of separated signals from a second IF multiplexed signal.
Figure 9B:
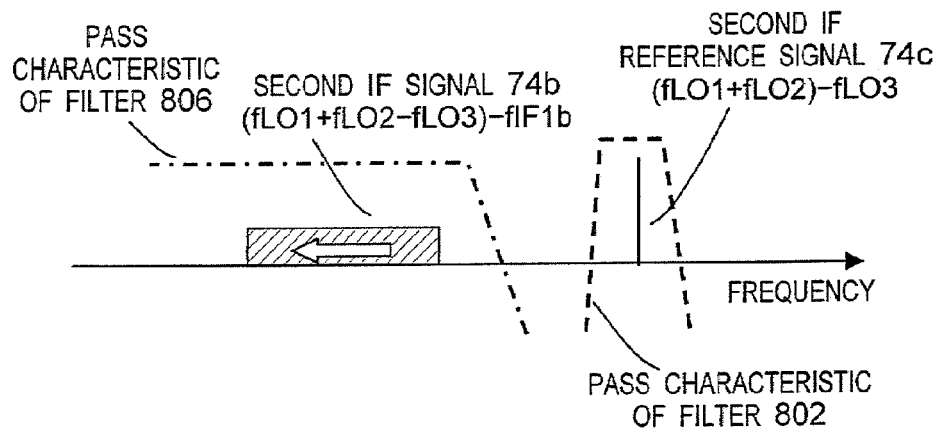
FIG. 9B is a frequency arrangement view of the other of the separated signals of the second IF multiplexed signal.

The characteristics of the second IF multiplexed signal separated by the filters 805, 806 are shown in FIGS. 9A and 9B. Besides, the extraction of the second IF reference signal 74c by the filter 802 is also shown in the figures.

In the first path P1, the filter 805 separates the signal wave to form a desired signal including the second IF reference signal 74c. In the second path P2, the filter 806 separates the signal wave to form a desired signal 74b comprising only part of the desired signal wave.

As a concrete example, in the case where a terrestrial digital broadcasting signal fIF1a and a satellite broadcasting signal fIF1b are used for the modulated signal wave shown in FIG. 2A, the filter 805 allows the reference signal wave 74c and a terrestrial digital broadcasting portion 74a to selectively pass therethrough. Meanwhile, the filter 806 allows a satellite broadcasting signal portion 74b to selectively pass therethrough. After level adjustment by an attenuators 807a, 807b, the signals are inputted to the mixers 804a, 804b, respectively, and converted frequency by the extracted local oscillation signals, respectively.

Figure 9C:
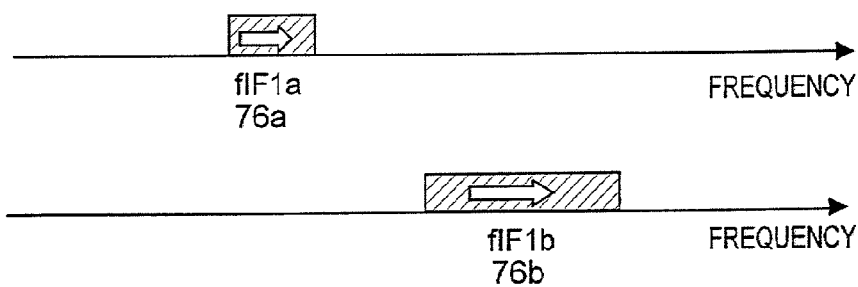
FIG. 9C is a frequency arrangement view of a demodulated signal.
Figure 10:
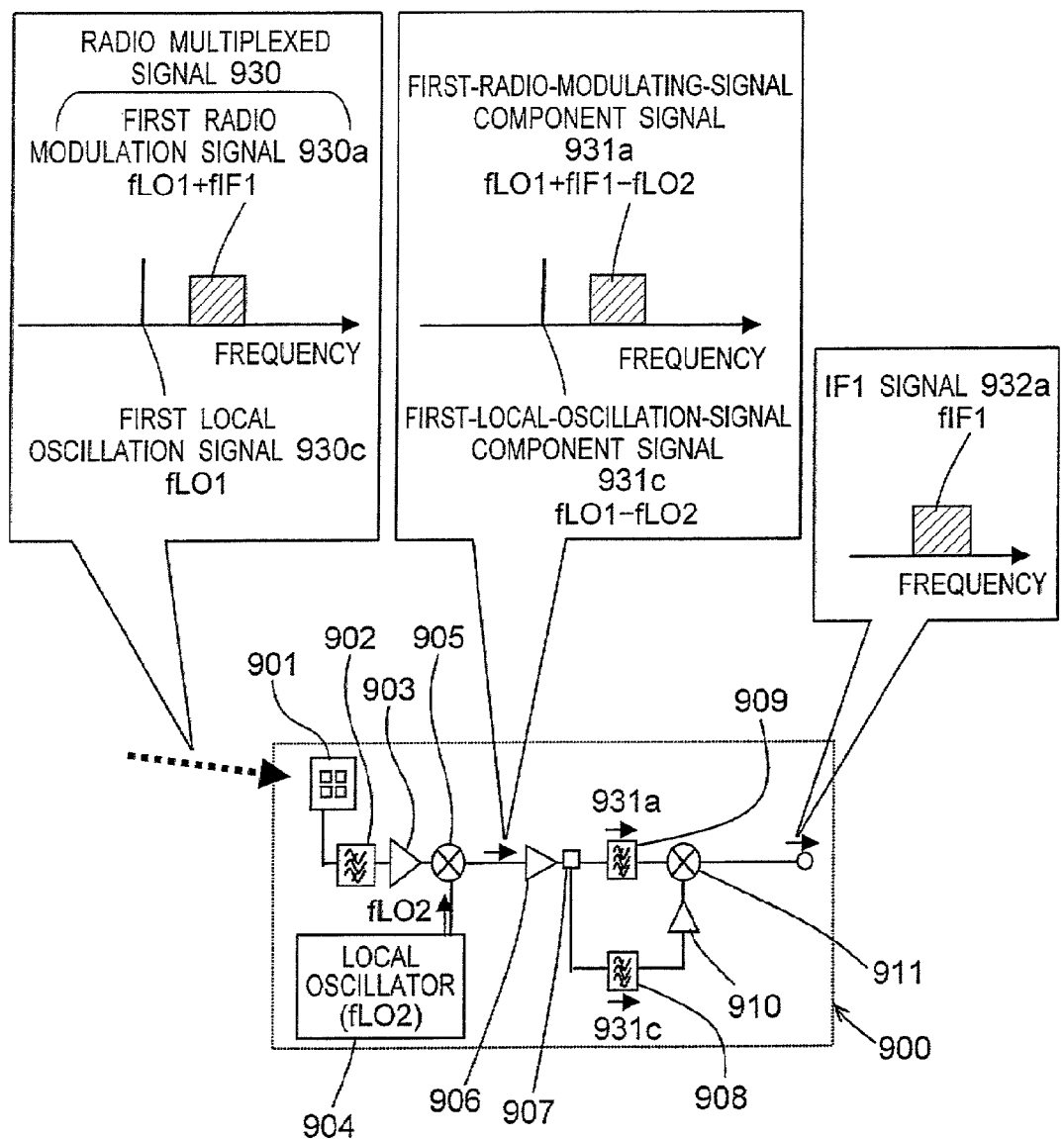
FIG. 10 is a schematic diagram showing configuration and frequency arrangement of a radio receiver according to a prior art.

The second frequency-converted signal wave, as shown in FIG. 9C, results in an arrangement that the terrestrial wave signal fIF1a and the satellite broadcasting signal fIF1b, which are input signal waves to the transmitter, have been demodulated. While the mixers 804a, 804b are similar in construction to that described in the second embodiment, it becomes implementable to control the operating biases of the mixers 804a, 804b independently of each other in order that reception C/N characteristic of the demodulated terrestrial signal fIF1a and satellite broadcasting signal fIF1b are optimized respectively. Therefore, the reception efficiency can be enhanced and the transmission distance can be elongated.

In addition, the attenuators 807a, 807b are weak ones of about 0.1 dB to 3 dB, and may be replaced with isolators or low-gain amplifiers. With the use of the attenuators or isolators or low-gain amplifiers, more stable down-convert with the extracted reference signal 74c used as the local oscillation source becomes achievable when a loop L2 made up of the first path P1 and the third path P3 and a loop L3 made up of the second path P2 and the third path P3 are approximated to negative feedback loops, respectively.

Furthermore, through the band dividing by the filters 805, 806 and the down-convert in the narrow band, influences of distortions due to frequency conversion, particularly of second and third harmonic distortions, can be reduced. Besides, the amplifiers 803a, 803b, 803c are placed after the three-dividing, and the local oscillation is shared between the mixers 804a, 804b, and moreover the amplifiers 803a, 803b are placed after the two-dividing 801b. By virtue of the isolation function of the amplifiers, the individual second IF signals 74a, 74b can be prevented from leaking from local oscillator terminals of the mixers 804a, 804b.

In this embodiment also, as in the second embodiment, since the operating biases of the mixers are controlled according to the received signal strength, even when the received signal strength becomes excessively large, the mixers can be prevented from being broken. Although the mixers 804a, 804b are controlled independently of each other in the above case, those mixers may also be controlled in common. For example, it is allowed to integrate the bias control circuits 305 and the resistor 320 into one to form a common bias circuit, where an identical operating bias is fed to the mixers.

In this embodiment, since the second IF reference signal 74c is contained in the path P1, some degree of DC current component occurs to the mixer 804a, and the current component can be used for bias control. However, in the path P2, in which the second IF reference signal 74c is not contained, and therefore, in the case where the DC current component generated from the down-convert becomes so small that the DC current component can hardly be used for the bias control of the mixer 804b, the biases may be commonized so that the mixer 804b can be controlled by the DC current component generated in the mixer 804a. As a consequence, deterioration of the C/N characteristic and deterioration of the distortion characteristic can be reduced.

The foregoing embodiments have been described with the terrestrial wave and the satellite broadcasting wave as modulated-wave input signals. However, the modulated-wave input signal may also be two satellite broadcasting waves, or a combination of a satellite broadcasting wave and a CATV (Cable Television) signal or the like, and otherwise, a modulated-wave signal in the IF stage of radio LAN or in RF stage or the like may be used as the modulated-wave input signal.

The foregoing embodiments have been described on a radio communication system for transmitting and receiving radio signals of the milli-wave band. However, the radio signal is not limited to the milli-wave band, and the present invention is applicable to microwave frequency bands including the milli-wave band.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:
1. A radio receiver including:
a first down-converter for receiving a radio multiplexed signal containing a first signal and a second signal and down-converting the received radio multiplexed signal by a local oscillation signal from a local oscillator that is applied to an Nth order harmonic mixer, where N is a natural number greater than 2, and the frequency of the local oscillation signal from the local oscillator is set to a predetermined value based on N, the Nth order har- monic mixer then being configured to generate a first intermediate frequency signal;

a second down-converter including a second mixer for multiplying the first intermediate frequency signal received from the first down-converter and a further signal extracted from the first intermediate frequency signal by a filter to down-convert the first intermediate frequency signal so as to generate a second intermediate frequency signal, wherein the second mixer includes a control section for controlling an operating bias of a component responsive to bias in the second mixer to widen dynamic range of the second mixer in response to a signal strength of at least either one of the first intermediate frequency signal or the further signal, the control section has a resistor, and the resistor controls a current generated from the component responsive to bias in the second mixer to control an operating bias of the component responsive to bias in the second mixer.

2. A radio receiver including a down-converter for receiving a radio multiplexed signal containing a first signal and a second signal and multiplying the first signal and the second signal by a mixer to down-convert the radio multiplexed signal and generate an intermediate frequency signal, wherein the mixer includes a microwave transistor and a resistor with a resistance value of 10 KΩ or more that is connected to a base terminal of the microwave transistor, and the resistor with the resistance value of 10 KΩ or more controls a current generated from the microwave transistor of the mixer to control an operating bias of the microwave transistor to widen dynamic range of the mixer.

3. A radio receiver including:

a first down-converter for receiving a radio multiplexed signal containing a first signal and a second signal and down-converting the received radio multiplexed signal by a local oscillation signal from a local oscillator that is applied to an Nth order harmonic mixer, where N is a natural number greater than 2, and the frequency of the local oscillation signal from the local oscillator is set to a predetermined value based on N, the Nth order harmonic mixer then being configured to generate a first intermediate frequency signal;

a second down-converter including a second mixer for multiplying the first intermediate frequency signal received from the first down-converter and a further signal extracted from the first intermediate frequency signal by a filter to down-convert the first intermediate frequency signal so as to generate a second intermediate frequency signal, wherein the second mixer includes a control section for controlling an operating bias of a component responsive to bias in the second mixer to widen dynamic range of the second mixer in response to a signal strength of at least either one of the first intermediate frequency signal or the further signal, component responsive to bias in the second mixer is a microwave transistor, the second mixer is a base injection type mixer for injecting the first intermediate frequency signal received from the first down-converter and the further signal separated from the first intermediate frequency signal to a base of the microwave transistor.

* * * * *